Patented Mar. 1, 1927.

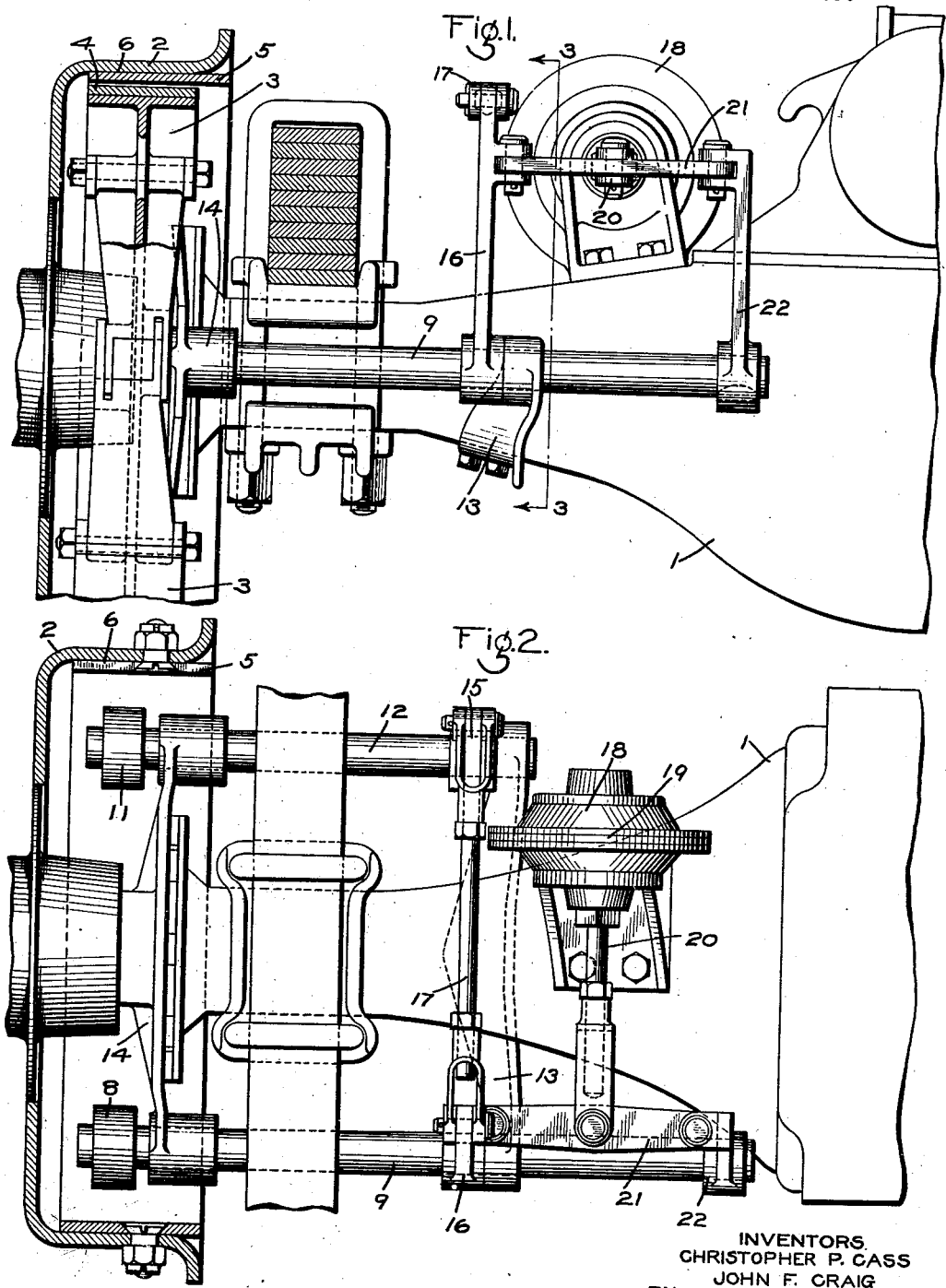

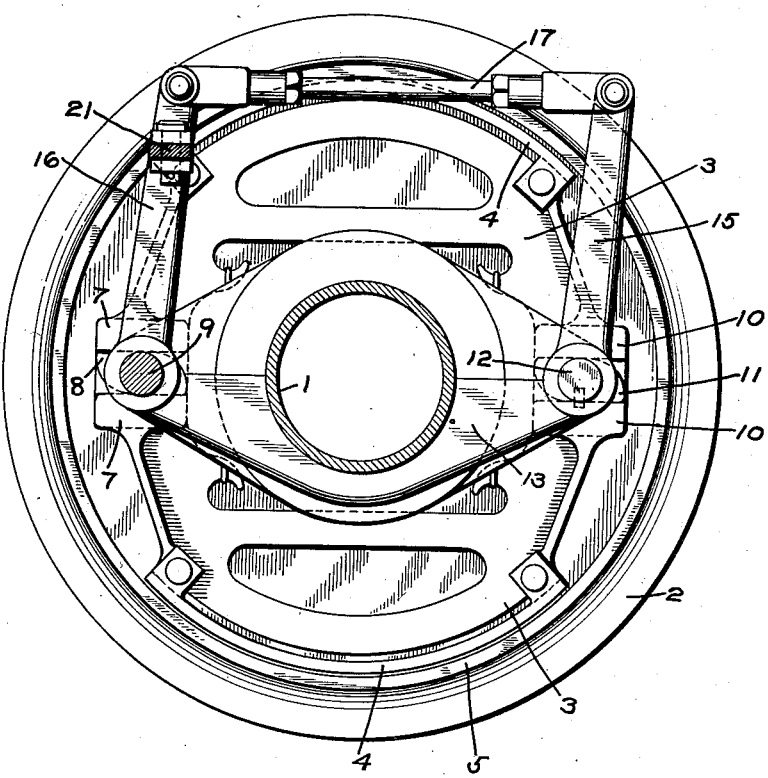

1,619,239

UNITED STATES PATENT OFFICE.

CHRISTOPHER P. CASS, OF BERKELEY, CALIFORNIA, AND JOHN F. CRAIG, OF EDGEWOOD, PENNSYLVANIA, ASSIGNORS TO THE WESTINGHOUSE AIR BRAKE COMPANY, OF WILMERDING, PENNSYLVANIA, A CORPORATION OF PENNSYLVANIA.

AUTOMOTIVE BRAKE DEVICE.

Application filed May 25, 1923. Serial No. 641,403.

This invention relates to a fluid pressure brake equipment adapted more particularly for application to motor vehicles.

The brake construction which is commonly employed on motor vehicles comprises a brake drum having an internal annular friction face, brake shoes adapted to engage said face, a cam interposed between adjacent ends of said brake shoes, and means for operating said cam to expand the brake shoes into frictional engagement with the drum.

With a brake construction of the above character, the expansive movement is effected at the cam ends of the brake shoes, while the anchored ends of the brake shoes have no expansive movement. This results in uneven wear of the brake shoes, the wear being greatest at the portions of the brake shoes nearest the cam.

The principal object of our invention is to provide a brake shoe and drum construction in which the brake shoes are simultaneously expanded in applying the brakes, both at the usual cam ends and at the pivot or anchor ends of the shoes, so that the wear of the brake shoes is evenly distributed throughout the extent of the wearing faces of the brake shoes.

In the accompanying drawings; Fig. 1 is an elevational view of a portion of the rear end of a motor vehicle, showing a brake construction, partly in section, applied thereto and constructed in accordance with our invention; Fig. 2 a plan view of the construction shown in Fig. 1; and Fig. 3 a section on the line 3—3 of Fig. 1.

As shown in the drawings, the reference numeral 1 indicates the rear axle housing of a motor vehicle and 2 a brake drum associated with the rear wheel of the vehicle in the usual manner. Mounted within the brake drum 2 are oppositely disposed brake shoes 3 each of which may be provided with a wear lining 4 adapted to frictionally engage a wear lining 5 secured to the interior annular face 6 of the brake drum 2.

Interposed between the adjacent ends 7 of the brake shoes 3 is a cam 8 which is secured to an operating shaft 9 and instead of providing the usual anchor and pivot pin connection between the opposite adjacent ends 10 of the brake shoes 3, according to our invention, an additional cam 11, similar to the cam 8, is interposed between said ends. The cam 11 is mounted on and secured to an operating shaft 12.

The outer ends of the shafts 9 and 12 are supported in bearings provided in a bracket 13 which is secured to the axle housing 1, and a bracket member 13 is provided with bearings for the inner ends of the shafts 9 and 12. Secured to the shaft 12 is a lever arm 15 and mounted to rotate on the shaft 9 is a lever arm 16, the arms 15 and 16 being pivotally connected at their upper ends by a link 17.

Secured to the axle housing 1 is a diaphragm brake chamber 18 containing a flexible diaphragm 19 which is operatively connected to a diaphragm rod 20. The outer end of the rod 20 is pivotally connected to the middle portion of an equalizing bar 21, one end of which is pivotally connected to the lever arm 16 and the other end of which is pivotally connected to a lever arm 22 secured to the extended end of the shaft 9.

In operation, when fluid under pressure is supplied to the brake chamber 18 in order to apply the brakes, the flexible diaphragm 19 therein is operated to move the diaphragm rod 20 outwardly. The equalizing bar 21 is likewise moved outwardly, so as to rotate the shaft 9 through the lever arm 22 and also the shaft 12 through the movement of the lever arm 16, the link 17 and the lever arm 15. The rotation of the shafts 9 and 12 operates to simultaneously rotate the respective cams 8 and 11 so that the adjacent ends 7 as well as the adjacent ends 10 of the brake shoes 3 are expanded to cause the brake shoes to frictionally engage the brake drum liner 5.

By effecting an expansive movement of the brake shoes at the usual pivot ends as well as at the usual cam ends, the brake shoes evenly engage the drum throughout their extent, thus producing an even wear of the brake shoe linings.

The provision of the equalizing bar 21 ensures the equal distribution of braking pressure to both of the operating cams 8 and 11.

Having now described our invention, what we claim as new and desire to secure by Letters Patent, is:—

In a vehicle brake, the combination with a brake drum, brake heads mounted in said drum and having opposite pairs of adjacent free ends, and a cam for spreading each pair of free ends, of a shaft for operating each cam, an operating arm secured to each shaft, a link connected to one arm, an equalizing bar connected to the other arm, a third arm connected to said link and to said equalizing bar, and a fluid pressure operated member connected to said equalizing bar at a point intermediate the ends of the bar.

In testimony whereof we have hereunto set our hands.

CHRISTOPHER P. CASS.
JOHN F. CRAIG.